United States Patent
DeMaira et al.

(10) Patent No.: US 9,304,223 B2
(45) Date of Patent: Apr. 5, 2016

(54) DEVICE FOR LOCATING OBJECTS AND COLLECTING DEBRIS AND ASSOCIATED METHOD

(71) Applicants: Robert Bosch Tool Corporation, Broadview, IL (US); Robert Bosch GmbH, Stuttgart (DE)

(72) Inventors: Michael DeMaira, Algonquin, IL (US); Ray Peppiatt, Gurnee, IL (US)

(73) Assignee: Robert Bosch GmbH, Stuttgart (DE)

(*) Notice: Subject to any disclaimer, the term of this patent is extended or adjusted under 35 U.S.C. 154(b) by 123 days.

(21) Appl. No.: 14/137,589

(22) Filed: Dec. 20, 2013

(65) Prior Publication Data

US 2014/0184192 A1    Jul. 3, 2014

Related U.S. Application Data

(60) Provisional application No. 61/746,318, filed on Dec. 27, 2012.

(51) Int. Cl.
*G01R 19/00* (2006.01)
*G01V 3/08* (2006.01)
*G01V 3/15* (2006.01)

(52) U.S. Cl.
CPC .... *G01V 3/08* (2013.01); *G01V 3/15* (2013.01)

(58) Field of Classification Search
CPC .............. G01V 3/08; G01C 9/02; G01C 9/12; G01C 9/16; G01C 9/18; B23B 47/34; B23B 11/005; B23B 11/007; B23B 35/00; B23B 49/00; A47L 5/38
USPC ..................... 324/67, 66, 226, 228, 262, 637; 356/247; 408/67, 16, 124, 241 R, 408/241 G; 15/314, 301, 347, 412; 29/26 A; 33/286, 370, 371, 376, 339, 342, 347, 33/349, 351, 353, 354, 285, 760; 81/3.2, 81/3.25, 3.48; 52/745.21; 173/217, 170, 1, 173/20; 362/119
See application file for complete search history.

(56) References Cited

U.S. PATENT DOCUMENTS

| | | | | |
|---|---|---|---|---|
| 5,400,514 | A | * | 3/1995 | Imbrie et al. .................... 33/286 |
| D589,318 | S | | 3/2009 | Meyer |
| 2003/0231303 | A1 | * | 12/2003 | Raskin et al. ................. 356/247 |

(Continued)

FOREIGN PATENT DOCUMENTS

| | | |
|---|---|---|
| CN | 101119828 B | 5/2010 |
| WO | 2006/087054 A2 | 8/2006 |

OTHER PUBLICATIONS

Power Tools Made Neat: Drill Dust Collector, http://gadgetcrave.com/power-tools-made-neat-drill-dust-collector/6932, retrieved May 6, 2010 (1 page).

(Continued)

*Primary Examiner* — Arleen M Vazquez
*Assistant Examiner* — Steven Yeninas
(74) *Attorney, Agent, or Firm* — Maginot Moore & Beck LLP

(57) ABSTRACT

A stud finder in one embodiment includes a first surface configured to be positioned adjacent to an object, a second surface generally opposite the first surface, an orifice opening to the first surface and to the second surface, a stud sensor configured to sense a structure through the object, and a vacuum source configured to draw a first vacuum in the orifice.

17 Claims, 9 Drawing Sheets

(56) References Cited

U.S. PATENT DOCUMENTS

| | | | |
|---|---|---|---|
| 2005/0000052 A1* | 1/2005 | Byles | 15/314 |
| 2009/0005747 A1* | 1/2009 | Michaels et al. | 604/319 |
| 2009/0308660 A1* | 12/2009 | Gouws | 175/207 |
| 2009/0317200 A1* | 12/2009 | Bruntner | 408/67 |
| 2010/0126112 A1* | 5/2010 | Schell et al. | 52/745.21 |

OTHER PUBLICATIONS

Jinhua Jinshun Tool Co., Ltd., New Laser Level & Drill Dust CatcherCombo, published at least as early as Dec. 26, 2012 (1 page).

* cited by examiner

DEVICE FOR LOCATING OBJECTS AND COLLECTING DEBRIS AND ASSOCIATED METHOD

This application claims the benefit of U.S. Provisional Application No. 61/746,318, filed Dec. 27, 2012, the entire contents of which are herein incorporated by reference.

FIELD OF THE INVENTION

The present disclosure relates to devices for detecting structures through other objects.

BACKGROUND

In general, there are known devices used for detecting lines, pipes, metal beams, or wooden beams or studs in walls, ceilings, and floors. These devices are referred to herein as "stud finders". Stud finders are particularly useful in the field of interior finishing work in which the locations of wooden studs behind a covering surface, such as drywall, are concealed after the covering surface is installed. For instance, when hanging an object on a wall, it is advantageous to fasten a hanger for the object onto a stud behind the covering surface. The increased vertical load bearing capability of a wall hanger attached to a stud is highly desirable compared to the load bearing capability of a wall hanger attached to a wall anchor in the covering surface or only to the covering surface itself.

When a stud is located behind the covering surface, the position of the stud is frequently marked so that a hole can be drilled into the covering surface and the stud. Significant dust and other debris are generated when the covering surface, particularly drywall or plasterboard, is removed during the drilling operation. This accumulation of dust and other debris is often unwanted because of the tedious cleanup associated with removing drill debris from finished interior spaces. Therefore, improvements to devices for interior finishing work that enable a single device to locate objects enclosed in or behind media and collect portions of the media when the media is removed to expose the objects are desirable.

SUMMARY

A stud finder in one embodiment includes a first surface configured to be positioned adjacent to an object, a second surface generally opposite the first surface, an orifice opening to the first surface and to the second surface, a stud sensor configured to sense a structure through the object, and a vacuum source configured to draw a first vacuum in the orifice.

A method of working an object includes positioning a stud finder proximate to the object, activating a sensor of the stud finder, moving the device across the object, sensing a structure through the object, drawing a vacuum in an orifice in the stud finder with the stud finder, inserting a tool through the orifice, and working the object with the tool.

DETAILED DESCRIPTION

Figure 1:
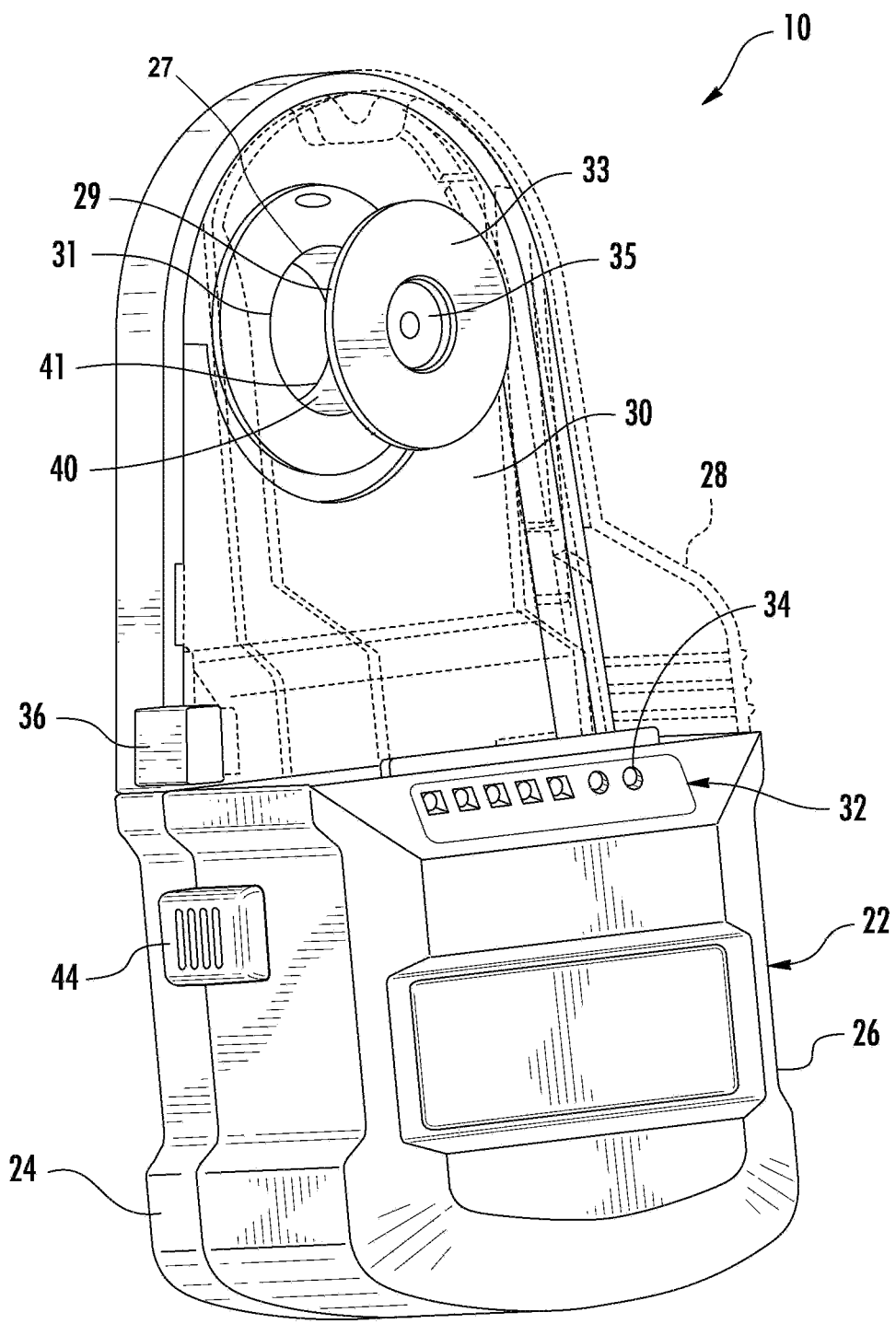
FIG. 1 is a left-perspective view of a stud finder including a vacuum source and a tool orifice.
Figure 2:
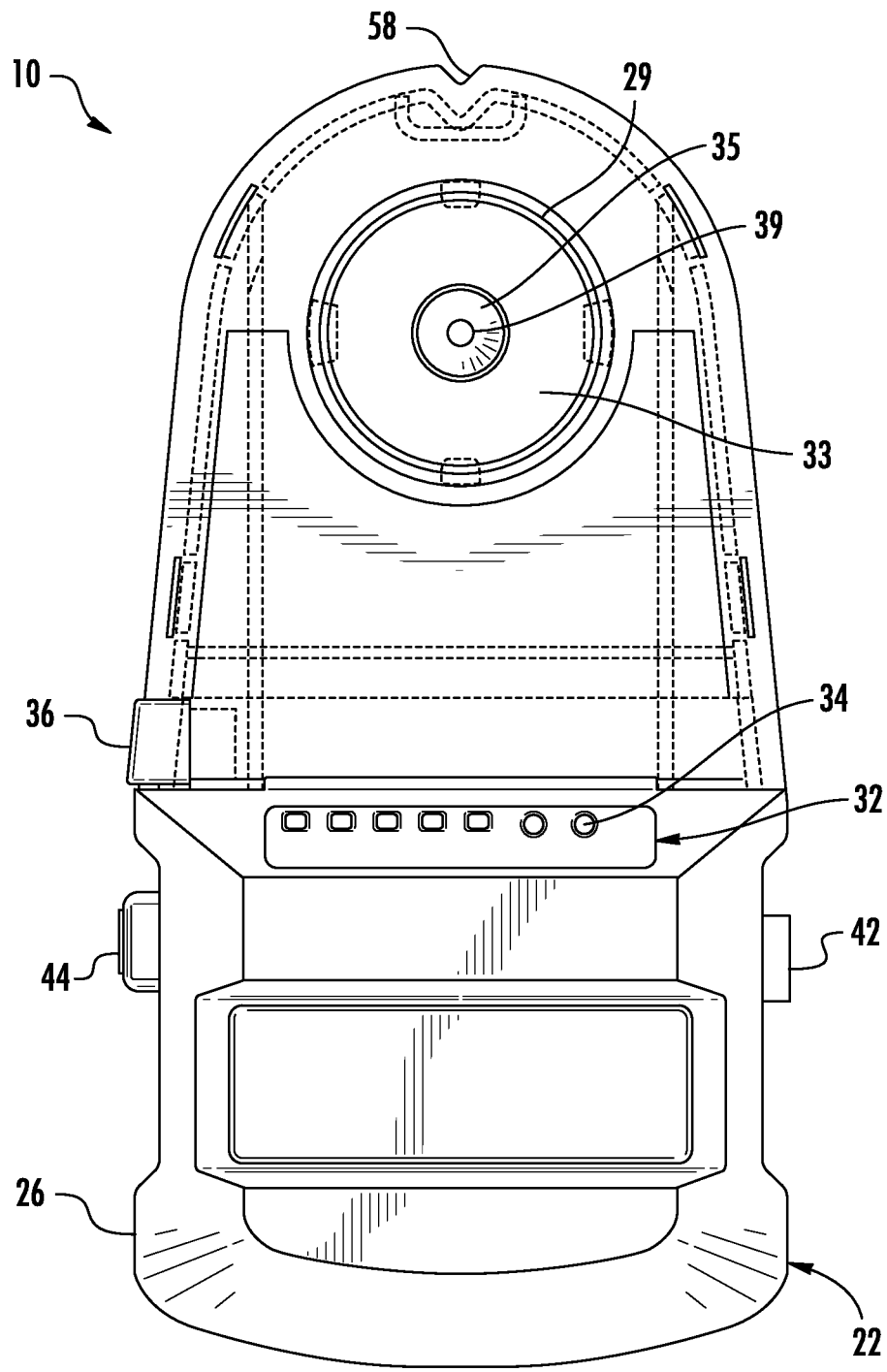
FIG. 2 is a front plan view of the stud finder of FIG. 1.
Figure 3:
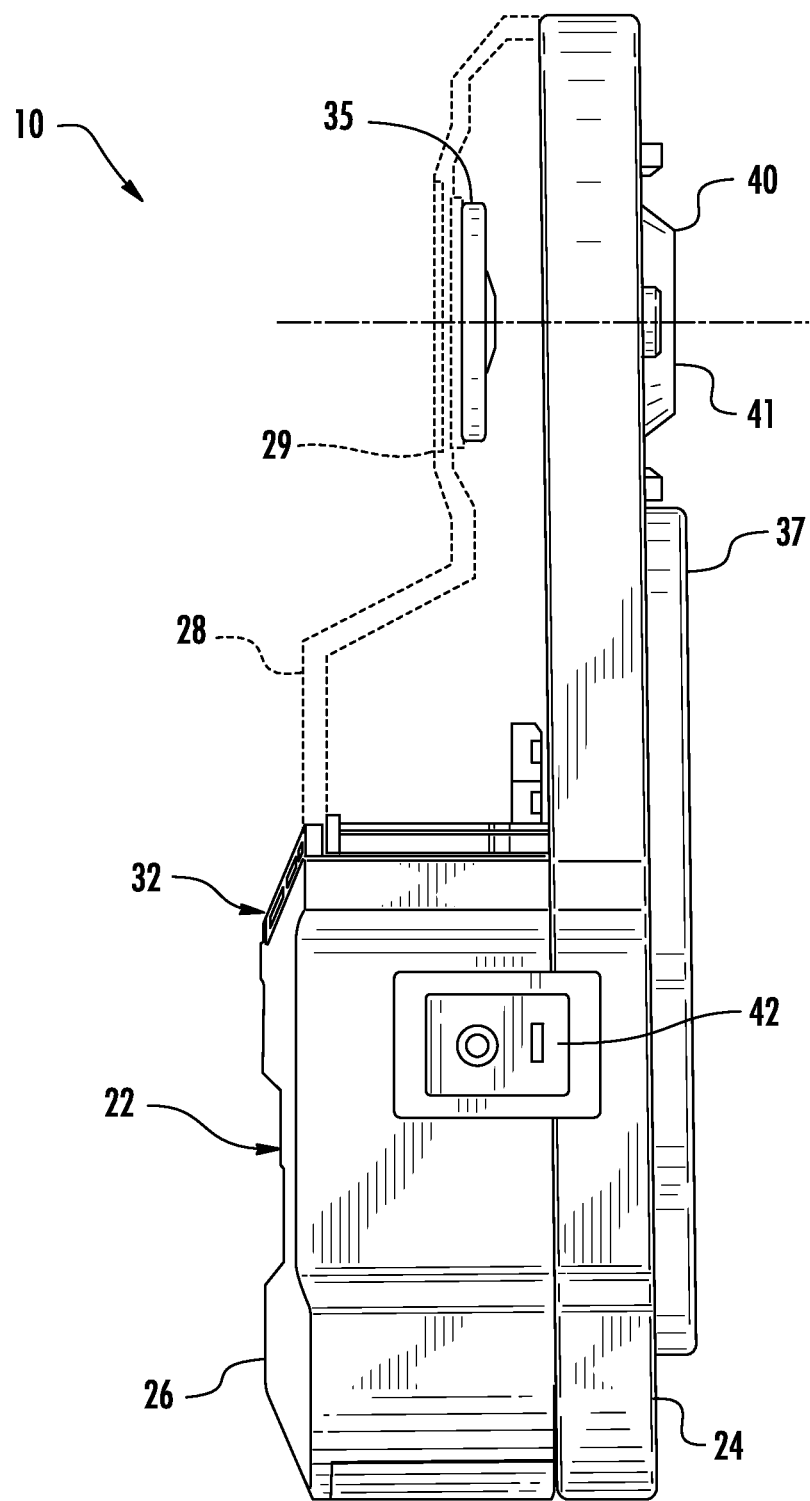
FIG. 3 is a right plan view of the stud finder of FIG. 1 showing respective heights of a vacuum seal and a rear seal in relation to a lower housing of the stud finder.

For the purpose of promoting an understanding of the principles of the disclosure, reference will now be made to the embodiments illustrated in the drawings and described in the following written specification. It is understood that no limitation to the scope of the disclosure is thereby intended. It is further understood that the disclosure includes any alterations and modifications to the illustrated embodiments and includes further applications of the principles of the disclosure as would normally occur to one skilled in the art to which this disclosure pertains.

FIGS. 1-6 show a stud finder 10 configured to detect a structure through an object. In the embodiment shown, the stud finder 10 is a combination device which includes a dust collector that is operable to collect dust and other debris generated when an object is worked, such as by drilling with a power tool.

Figure 4:
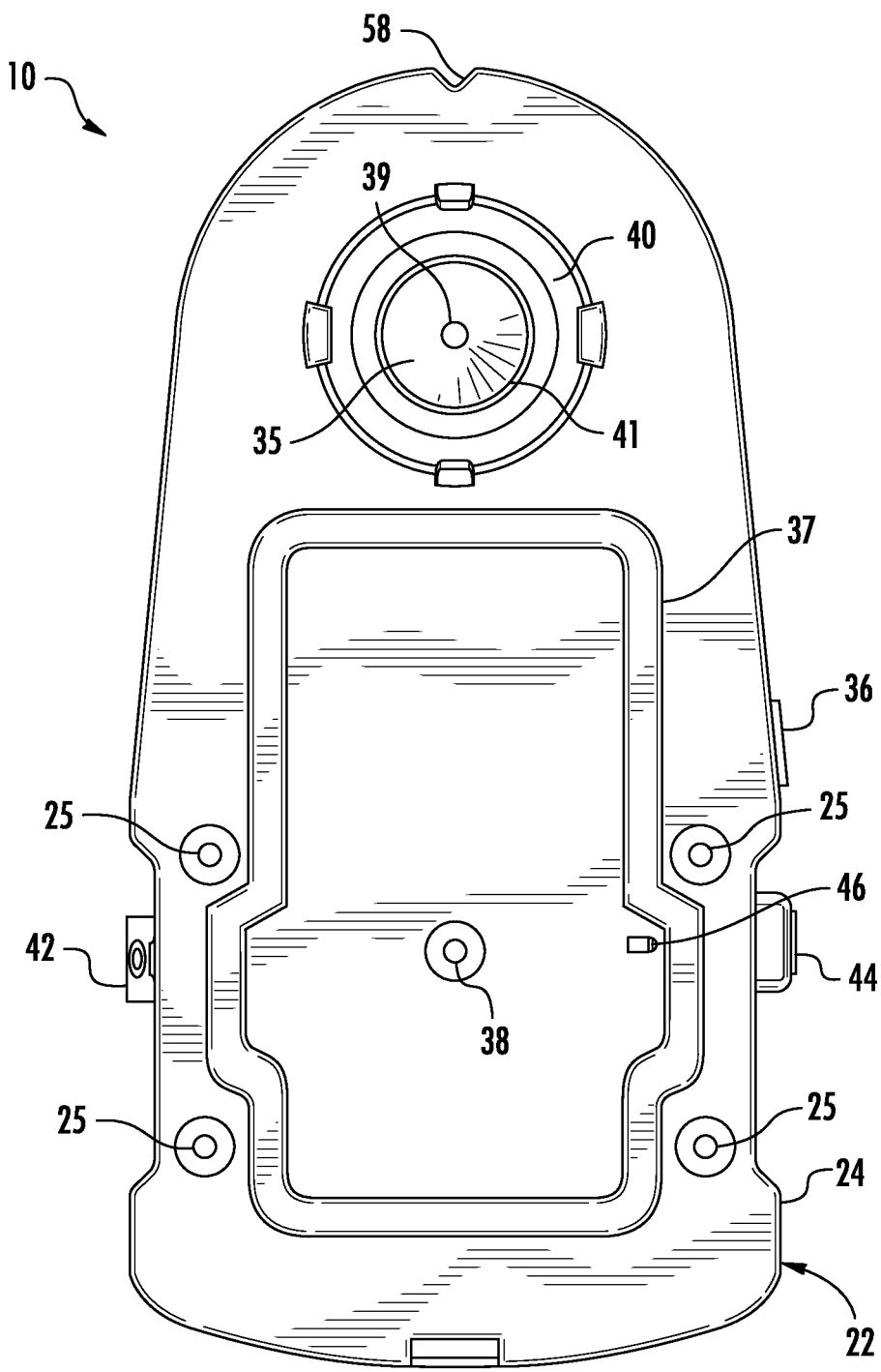
FIG. 4 is a back plan view of the stud finder of FIG. 1.
Figure 5:
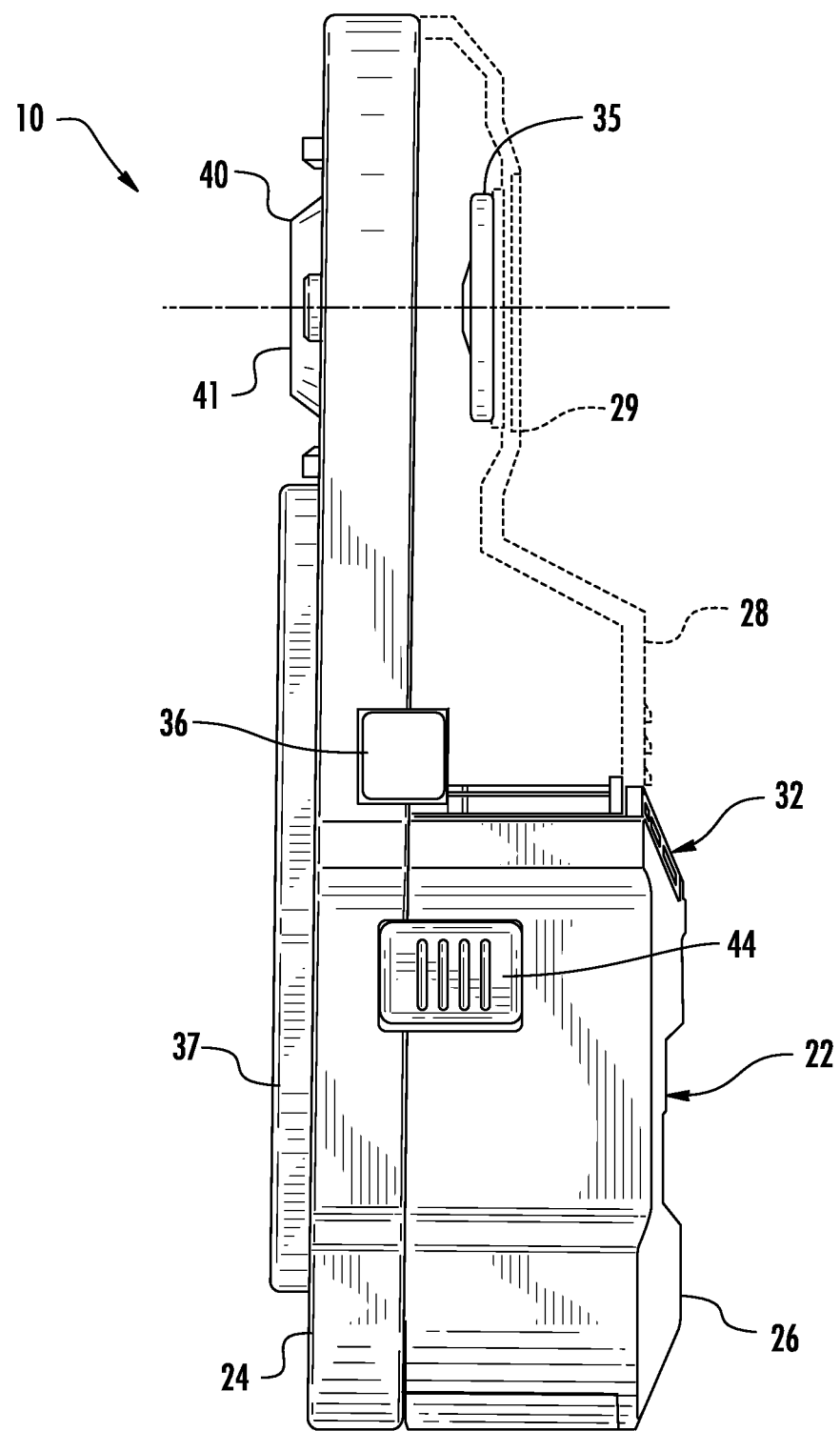
FIG. 5 is a left plan view of the stud finder of FIG. 1.
Figure 6:
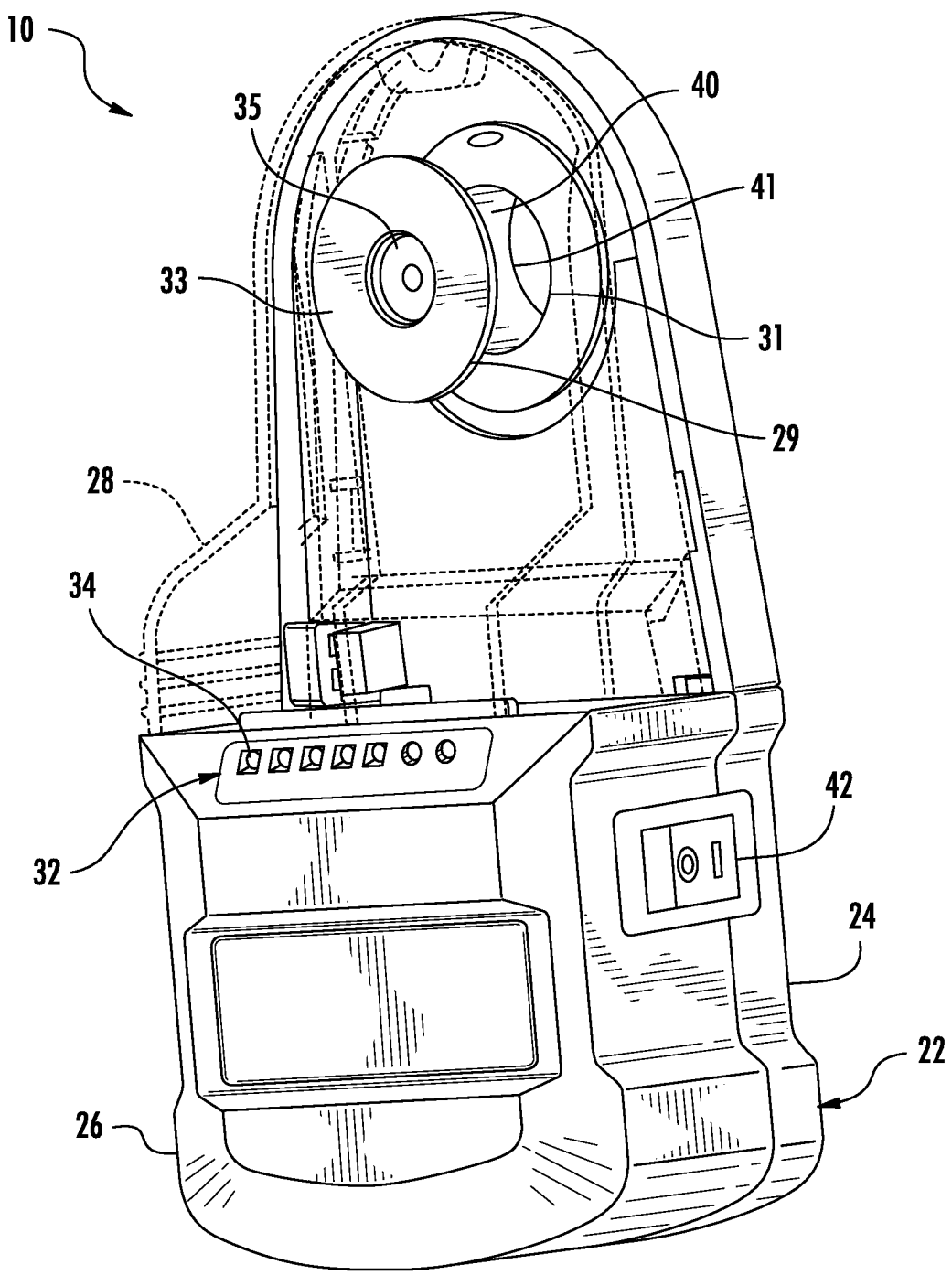
FIG. 6 is a right-perspective view of the stud finder of FIG. 1.

The stud finder 10 has a housing 22 formed from a lower half shell 24 and at least one upper half shell 26. The lower 24 and upper 26 half shells are secured to each other by a plurality of fasteners 25 as best shown in FIG. 4. In other embodiments, the lower 24 and upper 26 half shells are attached by other desired fastening methods. For example, the half shells 24, 26 in some embodiments are configured with respective features that enable the half shells 24, 26 to engage each other via a snap fit. In further embodiments, the half shells 24, 26 are ultrasonically welded to each other.

A removable debris cover 28 engages the housing 22 and forms an enclosed debris container for containing dust and other debris. The debris cover 28 in some embodiments independently forms the volume for containing the debris and is configured to be disengaged from the housing 22 for disposal of the collected debris. In other embodiments, the debris cover 28 forms the volume in cooperation with one or more of the lower half shell 24 and the at least one upper half shell 26. In these other embodiments, the debris cover 28 is opened or removed from the housing 22 and the collected debris is emptied from the stud finder 10.

The debris cover 28 as shown is formed from a transparent colored material, but other material colorings are possible. The transparency of the debris cover 28 enables a user operating the device 10 to determine a quantity of the dust and other debris collected. In some embodiments, such as those utilizing non-transparent colored materials for the debris cover 28, the device 10 includes alternative features for the user to determine the quantity of dust and other debris collected. For example, an access hole (not shown) is formed in an appropriate location on the debris cover 28 or the housing 22 in some embodiments so that the quantity of dust and other debris contained in the debris container can be visually perceived.

In further embodiments, a sensor or a transducer is disposed or integrated in the debris cover 28 to monitor and determine the presence of the debris. A notification system with an audible feature or a light feature is configured to alert a user of the need to remove of excessive debris contained in the debris container. If the level of the debris is higher or above a predetermined threshold, a signal from the sensor is sent to the notification system which in turn triggers the notification system to produce audible energy or light energy. The notification system may be either electrically coupled to the sensor as two separate components or mechanically integrated into a housing for encapsulating the sensor as a single sensor package system. The sensor may be for example, a MEMS sensor, capacitive sensor, a resistive sensor, a volume sensor, a debris sensor, or other sensing device.

An orifice 27 extends completely through the stud finder 10 and opens to the housing 22 at a front mouth 29. The orifice 27 opens to the outer surface of the debris cover 28 at a rear mouth 31. The orifice 27 is configured to permit a portion of a tool, such as a drill bit, to pass through the orifice 27. In some embodiments, the front mouth 29 has an orifice protector 33, such as a metal disk or washer, fastened to or press fit into the debris cover 28. The orifice protector 33 functions to protect the debris cover 28 from gouging or excessive abrasion from tools which are too large or not concentrically aligned with the orifice 27 prior to insertion of the drill bit through the orifice 27.

A tool cleaner 35 is disposed between the front 29 and rear 31 mouths to clean the various surfaces of, for example, a drill bit after the bit has been used to work an object. The tool cleaner 35 forms a tool cleaner orifice 39 through which the drill bit passes to engage the object. The tool cleaner 35 is configured to surround and physically interact with the various surfaces of tools including drill bits such that any dust or debris on the surface of the tool is removed as the tool is moved through the orifice 27. In some embodiments, the tool cleaner 35 is an elastomeric material that substantially extends across the entire orifice 27, but that permits a tool to pass through it. In other embodiments, the tool cleaner 35 includes a plurality of bristle-like elements arranged to surround and physically interact with the various surfaces of the tool.

A vacuum seal 37 is attached to an external surface of the lower half shell 24 to enable the stud finder 10 to be affixed to an object when the dust collection function of the stud finder 10 is used. The vacuum seal 37 forms a closed boundary having a surface that is offset from the external surface of the lower half shell 24. When the stud finder 10 is held adjacent to the object, a pump (not shown) disposed within the housing 22 is configured to generate a vacuum within a vacuum space defined by the covering surface, the vacuum seal 37, and the lower half shell 24. The pump draws air from the vacuum space through a vacuum orifice 38 formed in the lower half shell 24 and located within the boundary formed by the vacuum seal 37.

In addition to generating the vacuum within the vacuum space, the pump is further configured to generate a vacuum within the debris container. This negative pressure causes air to be drawn through the front and rear mouths 29/31, thereby facilitating the capture and containment of dust and other debris when the covering surface is drilled. A rear seal 40 is secured to the lower half shell 24 and is positioned concentric to the rear orifice 31. The rear seal 40 forms a rear seal orifice 41 that enables the rear seal 40 to be positioned around the portion of the object worked by the tool. The positioning of the rear seal 40 over the drilled portion of the object ensures substantially all of the dust and other debris from the object is collected by the stud finder 10. The rear seal 40, in a form of a gasket, is made from material having polymer properties, such as rubber or plastic material. The real seal 40 firmly compresses to the wall during operation.

The vacuum seal 37 is formed from a foam or elastomeric material that provides sufficient flexibility to enable the vacuum seal 37 to conform to surface imperfections on the covering surface and to maintain a substantially air-tight seal therebetween. The vacuum seal 37 has a height relative to the external surface that allows the vacuum seal 37 to compress during vacuum formation, but that ensures sufficient clearance between the stud finder 10 and the object. Additionally, the rear seal 40 provides a positive stop for the lower half shell 24 as the pump-generated vacuum in the vacuum space draws the stud finder 10 closer to the object and compresses the vacuum seal 37.

At least one sensor, for example, a capacitive sensor having at least one capacitor plate 30, is positioned within the housing 22 and is configured to generate an electrical field. Also positioned within the housing are an electronics system (not shown) for signal production and evaluation and an energy supply system (not shown), for example, batteries or accumulators. As the electrical field generated by the capacitive sensor is passed over the object, an incongruity in or beneath the object, such as a wooden stud, causes a change in the dielectric constant of the object. This change in the dielectric constant of the object is detectable by the electronics system, enabling the system to indicate the presence of a stud behind the object via a location signal.

Other types of sensors are employed to locate structures enclosed in or behind the object in other embodiments. For example, the stud finder 10 in some embodiments includes an inductive sensor having a coil system configured to locate metal structures enclosed by or located beneath an object. Inductive devices produce a magnetic field that is disturbed by the enclosed metallic structure. The magnetic field modified in this manner is measured by a detector having one or more coils, so that the position of the enclosed metallic structure can be located by shifting or moving the stud finder 10 over the object covering or enclosing the structure. In other embodiments, the stud finder 10 includes a Hall Effect stud sensor configured to detect the presence of a ferrous material. Other sensors such as GMR sensors, metal sensors are suitable for the stud finder 10.

The stud finder 10 further includes a display 32 for transmitting an output signal correlated with the location signal produced by the electronics system. Through the display 32, it is possible to visually represent the strength of the location signal as the stud finder 10 is moved over the object and encounters studs or other structures. For instance, the display 32 in some embodiments includes a plurality of aligned LEDs 34 or similar light emitting devices that are selectively triggered as the stud finder 10 is moved toward or away from the location of the stud behind the object. Similarly, the display 32 in other embodiments comprises a segmented bar graph display or a graphic LCD display to represent the strength of the location signal.

The stud finder 10 in some embodiments includes an audio device (not shown) that generates audible sounds that represent the strength of the location signal. For example, the audio device generates a series of discrete tones or beeps that increases or decreases in frequency as the stud finder 10 approaches or moves away from the stud. The audio device is used alone or in conjunction with the display 32 to represent the strength of the location signal produced by the electronics system.

The stud finder 10 includes a number of operating elements configured to control the stud locating and dust collecting functions of the stud finder 10. A scanning button 36 provides power to the electronics system and the at least one sensor to activate the stud locating function of the stud finder 10. A pump switch 42 configured to toggle between an ON position and an OFF position provides power to the pump when the switch is toggled to the ON position. In some embodiments, the pump switch 42 is a touch control switch, a pressure sensing switch, a projected capacitive switch, or other smart sensing switch configured to actuate the stud finder 10.

The stud finder 10 further includes a vacuum release button 44 that actuates a release valve (not shown) cooperating with a vacuum release orifice 46 formed in the lower half shell 24. The vacuum release orifice 46 provides a path for air to return to the vacuum space to equalize the pressure differential between the vacuum space and the air outside the vacuum space. Equalization of the pressure between the vacuum space and the air outside vacuum space enables the stud finder 10 to be removed from the covering surface.

Figure 7:
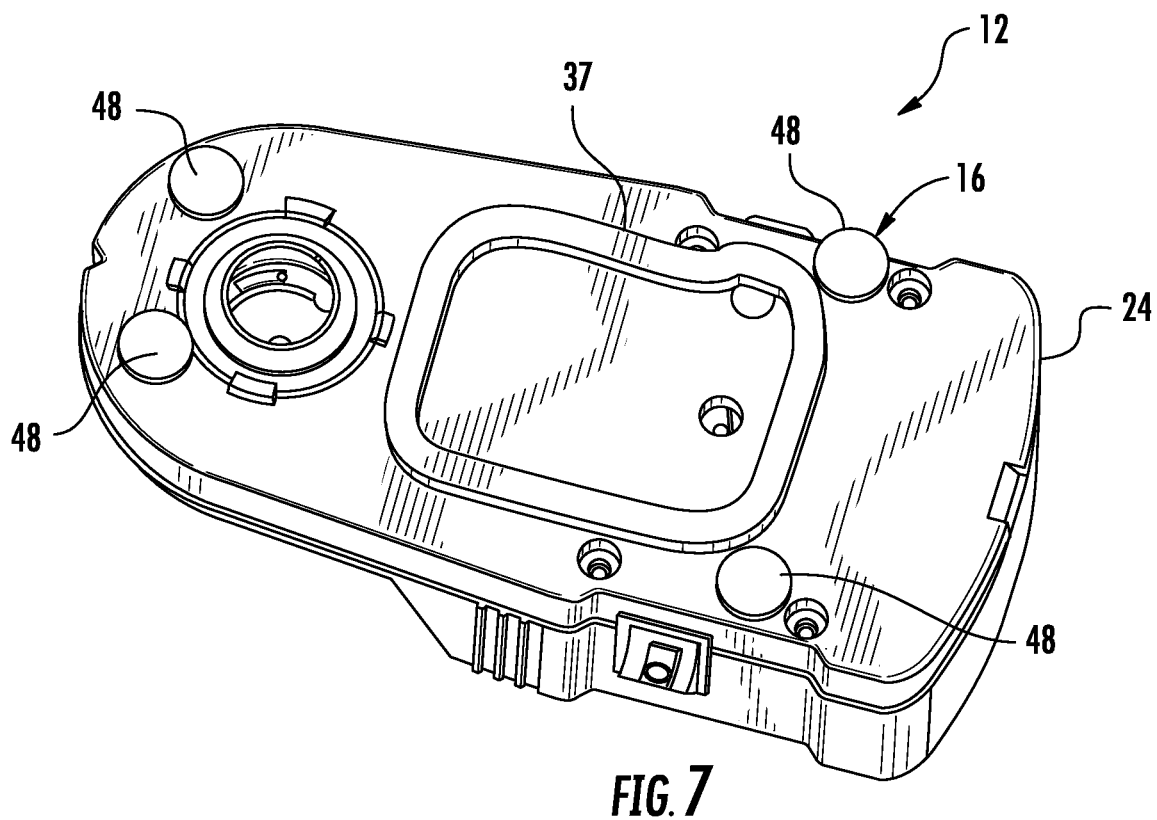
FIG. 7 is a bottom-perspective view of a stud finder incorporating a first embodiment of a vacuum seal protector configured to protect the vacuum seal as the stud finder is moved across a surface.
Figure 8:
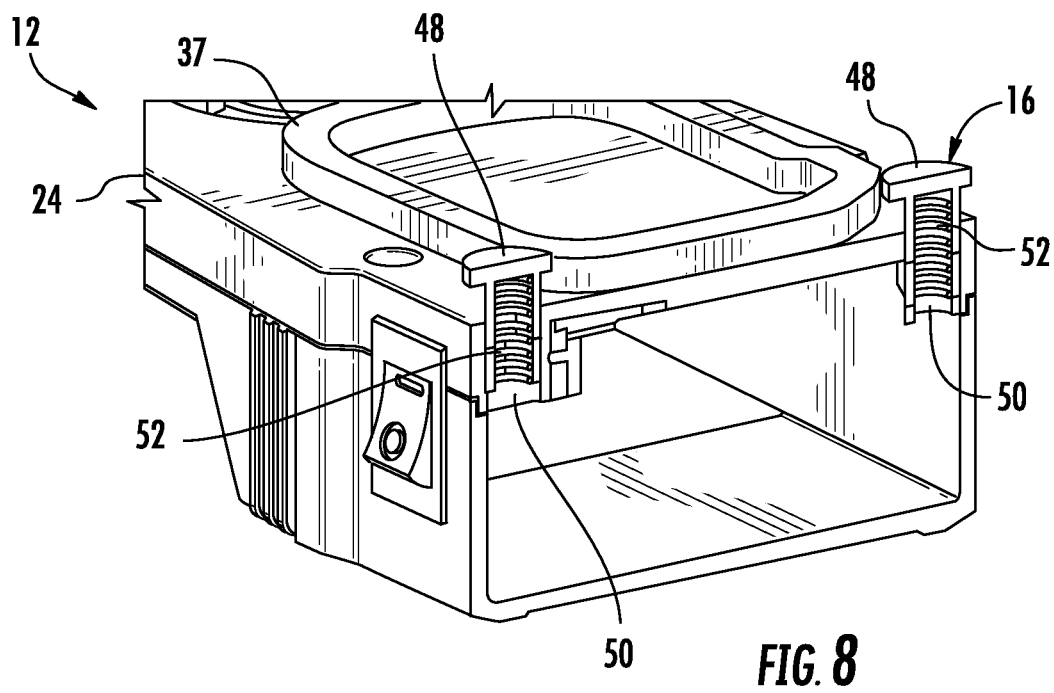
FIG. 8 is section view through two slider pads of the vacuum seal protector of FIG. 7.
Figure 9:
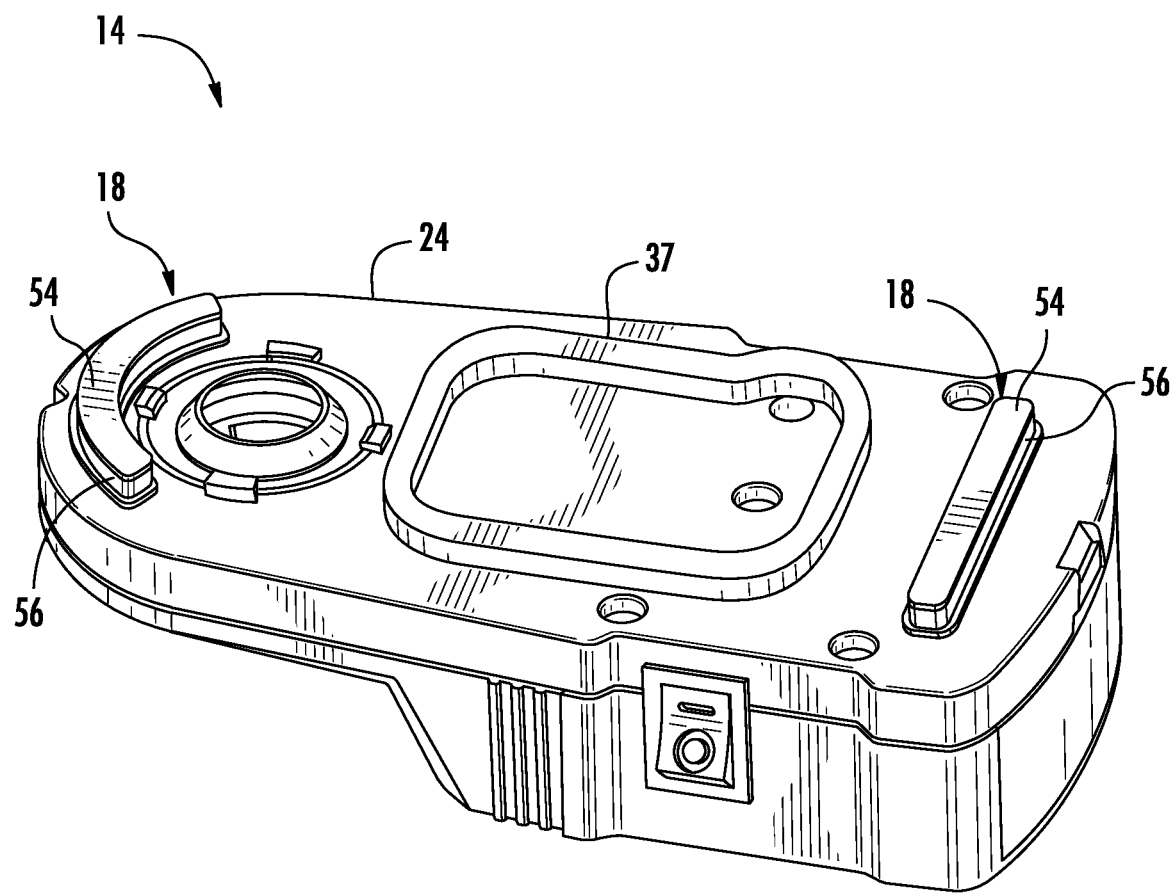
FIG. 9 is a bottom-perspective view of a stud finder incorporating a second embodiment of a vacuum seal protector.

FIGS. 7-9 show respective first 16 and second 18 embodiments of a vacuum seal protector incorporated on respective stud finders 12 and 14. In the first embodiment shown in FIGS. 7 and 8, the vacuum seal protector 16 includes a plurality of slider pads 48 spaced along the external surface of the lower half shell 24. As best shown in FIG. 8, the slider pads 48 are slidably disposed within respective recesses 50 formed in the lower half shell 24. A first resilient member 52, such as a compression spring, biases the slider pads 48 away from the external surface of the lower half shell 24. The biased slider pads 48 ensure there is a clearance between the covering surface and the vacuum seal 37 when the stud finder 12 is moved across a surface. The slider pads 48 are positioned over the lower half shell 24 in such a way that the lower half shell 24 remains essentially parallel with the surface of an object as the stud finder 12 is moved to engage the vacuum seal 37 with the covering surface.

The slider pads 48 have a sliding surface that interacts with the covering surface as the stud finder 12 is moved over the surface. As shown in FIGS. 7 and 8, the sliding surface is flat, or, in other words, the sliding surface is essentially parallel with the external surface of the lower half shell 24. The sliding surface in other embodiments is a contoured surface, such as a pointed or conical surface or a hemispherical surface. To accommodate interaction of the stud finder 12 with different types of covering surfaces, the stud finder 12 is provided with multiple sets of slider pads 48 with each respective set having respective sliding surfaces that are different from one another.

In the second embodiment shown in FIG. 9, the vacuum seal protector 18 includes at least two slider plates 54 positioned at opposing ends of the lower half shell 24. The slider plates 54 are affixed to respective second resilient members 56, such as foam or sponges, that are attached to the lower half shell 24 and bias the slider plates 54 away from the external surface of the lower half shell 24. The biased slider plates 54 ensure there is a clearance between the covering surface and the vacuum seal 37 when the stud finder 14 is moved across the covering surface.

The second resilient members 56 are formed from a foam or elastomeric material that provides sufficient flexibility and that resists permanent deformation or set. In some embodiments, the vacuum seal 37 and the second resilient members 56 can be formed from the same material. The second resilient members 56 have a height that is approximately the same as the height of the vacuum seal 37. In some embodiments, however, the second resilient members 56 have a height that is more or less than the height of the vacuum seal 37 as long as the slider plates 54 have a corresponding thickness sufficient to protect the vacuum seal 37 from abrasion during movement over the covering surface. In the embodiment shown in FIG. 9, the second resilient members 56 have the same height as the vacuum seal 37 and the slider plates 54 have a thickness of approximately 2 mm.

In other embodiments, the stud finder 10 is adapted to perform additional functions related to interior finishing work. For example, the electronics system of the stud finder 10 can be further configured to operate a line generator to illuminate a linear path along the covering surface. The illuminated path can be used, for example, to identify multiple, spaced apart positions along the covering surface to be drilled. In other embodiments, the electronics system of the stud finder 10 is further configured operate a leveling mechanism in conjunction with the line generator to illuminate a linear path along the covering surface that is "level" in relation to the force of gravity.

Figure 10:
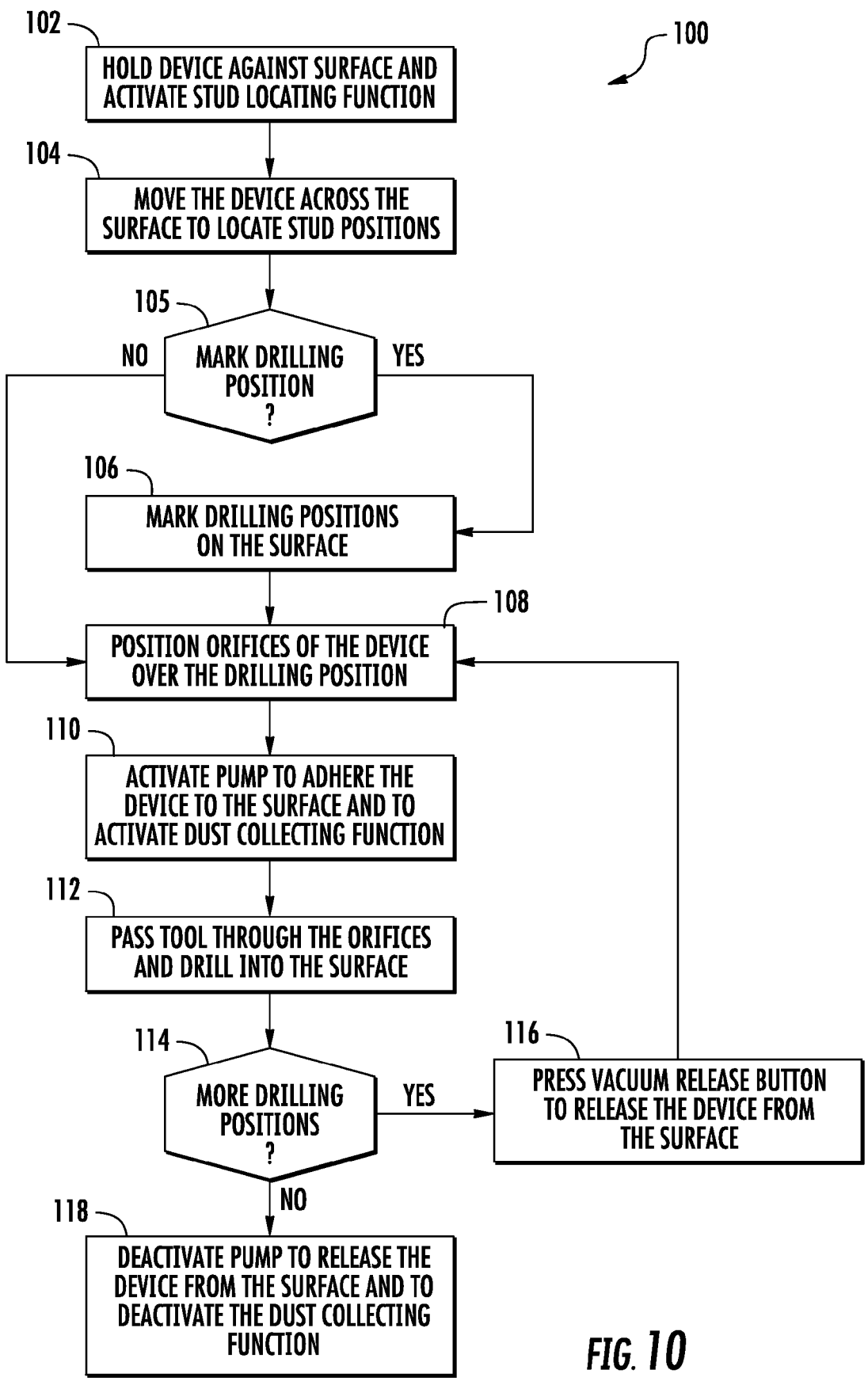
FIG. 10 is a flow diagram of a method for operating the stud finder of FIG. 1 to detect a structure through an object and to work the object.

A flow diagram of a method 100 for operating a stud finder is shown in FIG. 10. The method 100 is described with reference to the stud finder 10 shown in FIGS. 1-6. A user implements the method 100 by first holding the stud finder 10 against the surface of an object behind which at least one stud or other structure is located and activating the stud locating function of the stud finder 10 (block 102). The user activates the stud locating function by pressing and holding the outwardly biased scanning button 36. While the stud locating function is activated (block 102), the user moves the stud finder 10 across the surface of the object to locate stud positions (block 104).

The display 32 changes as the stud finder 10 approaches a stud enclosed behind the surface of the object. For example, one or more selected LEDs of the plurality of aligned LEDs are triggered as an edge of the stud is approached by a center of the stud finder 10. A central LED is triggered in some embodiments when the edge of the stud coincides with the center of the stud finder. The user identifies the location of the stud by observing the display 32 as the stud finder is moved across the surface of the object.

The studs in some embodiments are located by marking at least two opposing edge positions of the stud on the covering surface. In other embodiments, the stud finder 10 has a sensor configuration that enables the stud finder to simultaneously identify the opposing edges and the center of the stud. A notch 58 formed in the lower half shell 24 is positioned to coincide with the center of the stud finder 10. The notch 58 facilitates the user in marking the at least two opposing edge positions or the center position of the stud. When a stud is located by the stud finder 10, the user determines if one or more drilling positions need to be marked on the covering surface to facilitate drilling into the located stud (block 105). If position marking is needed, the user marks the one or more drilling positions on the surface of the object based on the locations of the studs (block 106). In some embodiments, the user estimates the drilling position based on the detected location of the stud and does not physically mark the drilling position on the covering surface. The scanning button 36 is released when there are no more studs to be located.

To use the dust collecting function of the stud finder 10, the user aligns the orifice 27 of the stud finder 10 with the marked or determined position to be drilled (block 108). With the stud finder 10 on the surface of the object, the pump switch 42 is toggled to the ON position to provide power to the pump (block 110). In the embodiments incorporating a vacuum seal protector (FIGS. 7-9), the user applies enough force on the device to overcome the resilient bias of the vacuum seal protector to seat the vacuum seal 37 against the covering surface. The pump generates a vacuum in the vacuum space that is strong enough to hold the stud finder 10 against the covering surface without assistance from the user. Simultaneously, the pump generates a negative pressure within the debris container that draws air into the debris container via the orifice 27. The seal 40 about the rear mouth 31 prevents air from passing into the orifice 27. Accordingly, once the vacuum is operating, air continues to be sucked into the debris container primarily via the front mouth 29.

While the pump is operating (block 110), the user passes the tool through the front 29 and rear 31 mouths and drills into the surface of the object and, if desired, into the stud (block 112). Any dust or debris generated from the drilling is captured by the stud finder 10 due to the positioning of seal 40 about the area being worked and the vacuum being drawn on the orifice 27 through the debris container. Moreover, movement of the drilling tool through the tool cleaner 35 positioned between the front 29 and rear 31 orifices removes any dust or debris attached to the surfaces of the tool as air is being sucked into the orifice 27 through the front mouth 29.

Once the marked position is drilled or otherwise worked (block 112), the user determines if there are more marked positions to be drilled (block 114). If there are additional marked positions to be drilled, the user presses the vacuum release button 44 to release the stud finder 10 from the object (block 116) and blocks 108-112 are repeated. The vacuum release button 44 enables the user to remove the stud finder 10 from the object while the pump is operating. To reposition the stud finder 10 with the pump operating, the user continues to press the vacuum release button 44 until the stud finder 10 is properly positioned for drilling the next marked position.

If there are no additional marked positions to be drilled, the user toggles the pump switch 42 to the OFF position and removes the stud finder 10 from the covering surface (118). If a residual vacuum remains after the pump is deactivated, the user can press the vacuum release button 44 to release the stud finder 10. The user can empty the debris container at any time if the dust or other debris collected in the container needs to be removed. To empty the debris container, the debris cover 28 is disengaged from the housing 22 and either the debris cover 28 itself is removed and emptied or, in some embodiments, the debris cover 28 is opened and the dust or other debris is emptied from the housing 22.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A stud finder, comprising:
    a housing having a first surface configured to be positioned adjacent to and facing an object and a second surface disposed generally opposite the first surface, the housing defining an orifice that extends through the housing and opens to the first and second surfaces such that a portion of the object is accessible through the orifice;
    a stud sensor accommodated within the housing and configured to sense a structure through the object; and
    a vacuum source accommodated entirely within the housing and configured to draw a first vacuum in the orifice.
2. The stud finder of claim 1, wherein the vacuum source is a pump.
3. The stud finder of claim 2, wherein the pump is configured to draw a second vacuum spaced from the first vacuum and adjacent to the first surface of the housing.
4. The stud finder of claim 1, further comprising:
    a vacuum seal attached to the first surface of the housing and extending outwardly away from the first surface.
5. The stud finder of claim 1, further comprising:
    a debris container operably connected to the orifice and the vacuum source.
6. The stud finder of claim 5, further comprising:
    a notification system configured to indicate a level of debris within the debris container.
7. The stud finder of claim 1, further comprising:
    a tool cleaner adjacent to the orifice opening at the second surface of the housing.
8. The stud finder of claim 1, further comprising:
    an orifice protector extending about the orifice at the second surface of the housing.
9. The stud finder of claim 4, further comprising:
    a seal mounted to the first surface of the housing and extending about the orifice opening at the first surface.
10. The stud finder of claim 1, further comprising:
    a plurality of slider pads extending from the first surface of the housing, each of the plurality of slider pads including a respective resilient member configured to bias the respective slider pad away from the first surface.
11. A method of working an object, comprising:
    positioning a stud finder proximate to the object;
    activating a sensor of the stud finder;
    moving the stud finder across a surface of the object;
    sensing a structure through the object;
    drawing a vacuum in an orifice in the stud finder with a vacuum source accommodated entirely within the stud finder;
    inserting a tool through the orifice; and
    working the object with the tool.
12. The method of claim 11, further comprising:
    removing air from a vacuum space defined by a vacuum seal extending from a housing surface of the stud finder and by the surface of the object to hold the stud finder proximate to the surface of the object.
13. The method of claim 12, further comprising:
    compressing a resilient member of a slider pads against the surface of the object prior to removing air from the vacuum space.
14. The method of claim 11, wherein drawing the vacuum comprises:
    drawing the vacuum through a debris container.
15. The method of claim 14, further comprising:
    indicating a level of debris in the debris container.
16. The method of claim 15, wherein indicating the level comprises:
    emitting one or more of an audio signal and a visual signal to indicate the level of debris.
17. The method of claim 11, further comprising:
    emitting visible light energy from the stud finder to form a visible line on the surface of the object.

* * * * *